US006538203B1

(12) United States Patent
Nölle et al.

(10) Patent No.: US 6,538,203 B1

(45) Date of Patent: Mar. 25, 2003

(54) CONNECTION OF AN ELECTRICAL ALUMINUM CABLE WITH A CONNECTION PIECE OF COPPER OR SIMILAR MATERIAL

(75) Inventors: Günther Nölle, Lörrach (DE); Franz-Josef Lietz, Oberhausen (DE)

(73) Assignee: Auto Kabel Managementgesellschaft mbH, Hausen (DE)

(*) Notice: Subject to any disclaimer, the term of this patent is extended or adjusted under 35 U.S.C. 154(b) by 0 days.

(21) Appl. No.: 09/512,302

(22) Filed: Feb. 24, 2000

(30) Foreign Application Priority Data

Feb. 24, 1999 (DE) ........................................ 199 08 031

(51) Int. Cl.[7] ............................. A01R 4/00; A01R 4/02

(52) U.S. Cl. .................... 174/84 R; 174/84 C; 439/874

(58) Field of Search ................................ 174/84 C, 78, 174/74 R, 84 R, 85; 439/98, 877, 882, 874

(56) References Cited

U.S. PATENT DOCUMENTS

| | | | | |
|---|---|---|---|---|
| 1,982,212 A | * | 11/1934 | Hagist | 173/269 |
| 2,165,323 A | | 7/1939 | White | 173/269 |
| 2,338,524 A | * | 1/1944 | McCabe | 18/59 |
| 2,357,591 A | * | 9/1944 | Kleinfelder | 174/84 |
| 2,802,257 A | * | 8/1957 | Holtzapple | 29/155.55 |
| 2,806,215 A | * | 9/1957 | Redslob | 339/276 |
| 3,123,663 A | * | 3/1964 | Muldoon | 174/84 |
| 3,146,519 A | * | 9/1964 | Redwine | 29/155.55 |
| 3,626,363 A | * | 12/1971 | McIver | 399/276 R |
| 3,712,528 A | | 1/1973 | Takagi et al. | 228/2 |
| 3,728,781 A | * | 4/1973 | Curtis et al. | 29/470.3 |
| 3,739,322 A | * | 6/1973 | Haegert | 339/230 R |
| 3,857,995 A | * | 12/1974 | Wyrick | 174/84 |
| 3,912,358 A | * | 10/1975 | Miller et al. | 339/276 T |
| 3,956,823 A | * | 5/1976 | Kuo | 29/628 |
| 4,315,175 A | * | 2/1982 | Hamilton et al. | 310/71 |
| 4,949,454 A | * | 8/1990 | Schauer et al. | 29/860 |
| 6,015,953 A | * | 1/2000 | Tosaka et al. | 174/79 |

FOREIGN PATENT DOCUMENTS

| | | | | |
|---|---|---|---|---|
| DE | 19 16 895 | | 11/1969 | |
| DE | 2 249 707 | | 4/1973 | |
| DE | 2 327 601 | | 1/1974 | |
| DE | 24 20 236 A1 | | 11/1975 | |
| DE | 26 39 560 A1 | | 3/1977 | |
| DE | 25 44 927 A1 | | 4/1977 | |
| EP | 0 125 042 A | * | 2/1984 | H01R/4/02 |
| EP | 0 125 042 A1 | | 11/1984 | |
| JP | 54-24242 | * | 2/1979 | B23K/21/00 |
| JP | 54-24242 A | * | 2/1982 | B23K/21/00 |

* cited by examiner

*Primary Examiner*—Dean A. Reichard
*Assistant Examiner*—William H. Mayo, III
(74) *Attorney, Agent, or Firm*—Akin Gump Strauss Hauer & Feld, L.L.P.

(57) ABSTRACT

A connection (V) of an electrical aluminum cable (1) with a connection piece (4) of another metal, especially of copper or a copper alloy, is brought about by crimping the wires (2) forming the aluminum cable (1) together in an end region and by welding to the connection piece (4), especially by a friction welding process. Moreover, the frictional heat between the materials is used to melt the two materials and to join them with each other without additional welding material. The aluminum cable (1) is provided for this purpose with a support sleeve (13) crimped upon it, which practically forms the individual wires (2) at the connection point into a solid surface, which is itself welded to the connection piece (4). Consequently, connection pieces of copper can be connected tightly and with good electrical conductance, without the danger of corrosion existing in the area of the connection due to various electropositive and electronegative metals.

13 Claims, 3 Drawing Sheets

CONNECTION OF AN ELECTRICAL ALUMINUM CABLE WITH A CONNECTION PIECE OF COPPER OR SIMILAR MATERIAL

BACKGROUND OF THE INVENTION

The invention relates to a connection of an electrical cable, especially one constructed of several aluminum wires or flexible leads and insulated aluminum cables, with a connection piece made of copper, copper alloy and/or brass or similar metal, for example with a battery clamp, a cable lug, a connection adapter, a plug element, a cable piece or the like, for the electrical system of a motor vehicle. The insulation of the aluminum cable ends before or at a distance from the contact point with the connection piece, and a support sleeve is provided, which encloses at least a region adjacent to the end face of the stripped (bared) part of the aluminum cable and is crimped and/or shrunk on the end of the aluminum cable, so that the wires of the aluminum cable are crimped together at least in the area of the end face.

The invention further relates to a process for connecting an electrical aluminum cable with a connection piece made of copper, copper alloy and/or brass or similar metal, for example a battery clamp, cable lug, connection adapter, plug element, cable or the like, for the electrical system of a motor vehicle. Here, the end face of the aluminum cable is brought into connection and electrical contact with the end face of the connection piece, and for this purpose the aluminum cable is bared (stripped of insulation) on the connection end. A support sleeve is crimped or shrunk on the stripped place, and the wires or flexible leads of the aluminum cable are thereby crimped together.

The idea is already known of replacing current-conducting leads of copper or copper alloys, especially energy leads, having a relatively large cross section in motor vehicles, with ones of aluminum, because aluminum even leads to a lower weight if the lead cross sections must be enlarged due to the somewhat lesser conductivity of aluminum in comparison with copper.

In this connection, experiments were conducted, and in U.S. Pat. No. 2,806,215, it was proposed to join the parts to be connected, i.e., an aluminum cable and a corresponding connection piece, by means of ferrules and clamps so as to conduct electricity. There, the problem nonetheless exists that, on the surface of aluminum under the influence of air oxygen, a thin oxide layer arises, whose thickness increases with time and which does not conduct electricity. The electrically conducting connection of an aluminum cable with a connection piece of another metal therefore requires the elimination or the penetration of such an oxide layer, and the prevention of a renewed formation of such an oxide layer.

Furthermore, with the connection of an aluminum cable made of individual wires or flexible leads with a connection piece, there results the necessity, for diminishing electrical resistance, of undertaking a clamp connection with high compressive force. This leads to deformations at the crimping site of the cross sections of the individual aluminum wires, so that these are weakened from the outset at the juncture point and can break under the dynamic stress in a motor vehicle in the course of time. Especially high dynamic stresses arise here in the area of the driving motor, the dynamo and even the battery.

On the other side, it is not possible to make the connection piece itself likewise of aluminum, because in the area of batteries or accumulators acid vapors cannot be entirely ruled out, which attack aluminum to a considerably greater extent than copper, copper alloys or brass, and because connections to units joined with a combustion motor, such as dynamos, are exposed to such a high dynamic stress that, in the course of time, the less stable aluminum material breaks or the connection juncture is destroyed.

Aluminum is also subject to a greater danger of corrosion than copper, which has a relatively good corrosion resistance, because aluminum is relatively electronegative. For this reason, aluminum has the tendency to convert to the more stable oxide form, from which is was created under the application of energy.

If metals of varying base character are conductively connected with one another, there exists the danger of a contact corrosion. Here, due to their electropositive potential, copper materials are less degradable than aluminum, but can also exert a degrading action on this metal in a connection with it. Since aluminum is the more electronegative metal in comparison with copper, it can also occur in a contact connection with high currents and longer stress times, chiefly in a humid, salt-containing climate, that the more electronegative metal, i.e., the aluminum, acts as the "sacrificial anode" and deteriorates. Thus, with time, a loss of material occurs on the contact surface, which has a negative effect on the contact resistance and stability.

Even with the use of an aluminum ferrule surrounding the stripped aluminum cable, and welding it with a connection piece of copper, according to FIG. 8 of U.S. Pat. No. 2,806,215, there exists the problem, within the aluminum ferrule, between the front ends of the aluminum wire and the connection piece made of copper, that a seam or a space remains and, in the course of time, the previously mentioned contact corrosion arises.

SUMMARY OF THE INVENTION

For this reason, there exists the object of creating a connection of the type mentioned at the beginning, which has a high degree of stability in relation to the dynamic stresses and a good conductivity, and which, on the one hand, eliminates an oxide layer or corrosion on the aluminum in the area of the juncture by the connection operation itself and/or, on the other hand, prevents an oxide layer in this area of mutual contacting of the different metals.

For accomplishing this objective, the initially mentioned connection of an electrical aluminum cable with a connection piece of another metal is wherein the connection piece is welded with the end face of the aluminum cable formed by the individual wires.

The connection is thus chiefly characterized by an additional support sleeve on the aluminum cable, which sufficiently stabilizes the individual wires or flexible leads by crimping them together and draws them closer to one another, in order to yield a metal surface on the end face of the cable, which is then at the same time the connection point or the place of welding with the connection piece. It is thereby possible to free this face of oxide, to the extent that it may have formed there, and then to butt weld this face with the connection piece, so that in the future as well no oxide can arise at this spot. As is well known, aluminum can be easily fused or welded with copper and thus, in the connection of the invention, even form a mutual alloy. Experiments have shown that the resistance to wear of such a connection can be higher than that of the aluminum cable and/or the connection piece themselves.

Since the individual wires of the aluminum cable themselves can be welded with the connection piece, and thereby also with themselves, there results a sub-metallic connection between the aluminum cable and its individual wires and the connection piece consisting of copper or a copper alloy, which can extend over the entire end face cross-sectional area. This sub-metallic connection layer, according to experiments, can be about 2 mm thick, so that an air or moisture access to this connection site is ruled out.

It is especially beneficial if the support sleeve reaches beyond the transition between the stripped region of the aluminum cable and the insulation, including a part of the insulation. The support sleeve thus expediently maintains a longer axial length than the stripped area of the aluminum cable, so that a good stiffening is attained in the area of the connection point up to under the insulation, which leads to an even distribution of the compressive forces in the connection area, without subjecting the individual aluminum wires too strongly to stress and to deformation. Consequently, such a connection point is also a match for shearing forces and dynamic stresses, as they can also occur in motor vehicles in reference to units connected with the motor. At the same time, a good sealing of the aluminum cable and the connection can be obtained.

Here, it is expedient if the one end of the supporting sleeve is flush with the end face of the stripped region of the aluminum cable. The support sleeve thereby then enlarges the connection point radially and is itself also available for welding with an appropriately proportioned connection piece or counterpart to the extent that the support sleeve crimping the end of the aluminum cable together is a metal sleeve, especially an aluminum sleeve. Above all, an aluminum sleeve has in this connection the advantage that it behaves, with reference to heat expansion, electrical conductivity and weldability, like the aluminum cable itself, and is thus to a certain extent an enhancement of the aluminum cable at the connection point.

It is especially beneficial if the aluminum cable and the shrunken on or crimped on support sleeve and the connection piece basically have a circular cross section, in particular of the same size. The welding point can then extend over the entire cross section of the connection and thereby at the same time over the entire cross section of the connection piece, on the one hand, and the unit formed by the aluminum cable and support sleeve, on the other hand. Correspondingly beneficial resistance values for the electric current can be attained on this large-area connection.

For the best possible distribution of compressive forces on the individual wires or flexible leads of the aluminum cable, it is beneficial if the support sleeve for crimping or pre-crimping the aluminum cable has in its interior at least two segments of different inside cross section or inside diameter. The segment with the larger inside diameter grips around the end of the insulation of the aluminum cable, and the segment of smaller inside diameter grips around the stripped area of the aluminum cable. Here, the difference between the inside diameters of the support sleeve corresponds approximately to double the thickness of the insulation of the aluminum cable.

With this configuration of the support cable, it is thus possible to take into account the cross sectional difference between the insulated and the non-insulated part of the aluminum cable, so that the support sleeve has a largely constant circumference before and even after the crimping on its exterior. The crimping means need not take into consideration any differences in cross section, although these are present in the interior of the support sleeve on the aluminum cable. Since the end of the crimping facing away from the connection point can be arranged in an insulated region of the aluminum cable, the individual wires of the cable are protected against excessively strong mechanical deformations due to the crimping operation, and consequently retain their stability.

It was already mentioned that the connection can be completed by butt welding. Here it is especially beneficial if the end of the aluminum cable provided with the support sleeve is joined with the connection piece by friction welding. Friction welding is known per se. In many cases this is brought about by bringing one of the pieces into rotation before the connection, then moving it against the other part, whereby frictional heat arises, which is high enough for welding the parts, so that they are connected firmly with each other after braking the rotation. Above all, in joining an aluminum cable with a connection piece, an oxide layer possibly arising at the connection point or end face of the aluminum cable can at the same time be automatically eliminated, because such a layer is penetrated and removed by the mechanical friction. Consequently, an electrical connection of an aluminum cable with a connection piece by friction welding is to be viewed as especially advantageous and beneficial, since relatively low energies are necessary for this type of welding, for example in comparison with an even conceivable flash butt welding.

The process, already mentioned at the beginning for accomplishing the objective, is wherein the individual wires or flexible leads of the aluminum cable are butt welded together with the support sleeve having the connection piece. Instead of applying expensive clamp connections, in which a mechanical clamping and joining of the two parts to be connected is carried out and which possibly must subsequently once again be encapsulated with plastic, the two parts of different materials are thus welded to each other. Here, the soft and flexible end face of the aluminum cable is first mechanically fastened by a support sleeve, in order to withstand the stresses of welding and to make this end face of the aluminum cable suitable for direct welding with a connection piece. There results here a practically closed metal surface formed from the individual wires or flexible leads of the aluminum cable.

In this connection, it is further expedient to proceed in that the support sleeve is arranged with one end flush to the end face of the aluminum cable. That is, one end of the support sleeve is relied upon and used to enlarge the end face of the aluminum cable and thereby of the connection point. At the same time, it is assured that on the face, the individual wires or flexible leads of the aluminum cable are also in fact arranged all crimped together and fastened with each other, on the one hand, and are nevertheless accessible for welding. These wires can furthermore be flush with one another and form a flat face or cross section surface.

An especially favorable method can consist in that the aluminum cable provided with the support sleeve is joined with the connection piece by friction welding. In comparison with an electrically supported butt welding process, it is advantageous that substantially less energy is required for this. Nevertheless, the friction welding process permits a welding of the materials, namely aluminum on the one hand and copper or a copper alloy or similar metal on the other hand, with the formation of intermetallic phases. That is, the oxide layer on the aluminum is destroyed, and the possibility of corrosion at the connection point is eliminated. Since the aluminum cable is crimped with the support sleeve before or at the latest simultaneously with the welding process, there arises a type of solid cylinder on whose end face or head surface the welding can take place. The crimping of the individual wires of the aluminum cable thus need only be good enough to withstand the stresses of the welding process. At the same time, such a friction welding process goes along with a slight loss of metal at the joining and welding point, which stands out in the form of a bulge around the seam, which at the same time enlarges the connection point and thereby strengthens the connection itself.

It is especially beneficial if the connection piece to be connected or butt welded with the aluminum cable is rotated and crimped while rotating against the end face of the aluminum cable, and is thereby fused or welded by the frictional heat arising after braking the rotation. Indeed, the friction and the frictional heat can also be brought about by other reciprocal relative movements. However, rotation has the great advantage that the parts to be connected can already occupy their final position in the transverse direction, and almost any desired number of rotations can be generated on the rotating part, in order to obtain enough frictional heat for the welding. At the same time, an oxide layer thus possibly situated on the aluminum side can be especially effectively penetrated and eliminated.

The wires or flexible leads of the aluminum cable can be crimped together before and/or during the welding process at least in the area of the end face connection point, which can be especially simply carried out with the above-mentioned support sleeve. Here, the support sleeve can be crimped flat on its exterior, especially into a polyhedron, for example into a hexagon. There thereby results, in addition, with the later assembly the possibility for a tool engagement, for example for engagement by a monkey wrench. Moreover, such a polyhedral shape on the exterior of the support sleeve can be advantageous in connection with the transfer and assembly of the cable with its connection piece.

The connection piece can either be a cylinder of copper or a copper alloy, for example brass, which for its part is connected with a corresponding connector or a cable clamp or a battery clamp or the like, or is already connected with it at the outset in one piece. Such a cylinder can be especially well set into rotation and be connected by friction welding with the appropriately prepared aluminum cable.

It is, however, also possible for a cable piece having wires made of copper, a copper alloy and/or brass, serving as a connection piece, to be crimped on its exterior with a support sleeve, especially of copper, copper alloy or brass or similar metal and butt welded with the face of the aluminum cable. Situations are namely conceivable where indeed cables essentially made of aluminum are used which, however, must nonetheless still be joined with a piece of a copper cable, particularly if high dynamic stresses can arise in the area of the connection point, or in the further course of such an electrical lead a material pairing requires copper or a copper alloy. In such a case, the connection piece to be connected with the aluminum cable can for its part be a cable piece made of copper wires or the like, which likewise is stabilized by means of a support sleeve. A friction welding process is thus made possible in particular by rotation, preferably of the copper element, whereby then the cable itself and the support sleeves are joined with each other and welded.

A device for implementing the process for connecting an aluminum cable with a connection piece of another metal can above all consist in that an openable jig is provided for the aluminum cable provided with the support sleeve, and a separable mounting arranged in alignment therewith is provided for the connection piece. The mounting has a rotary drive or is couplable with one, and the jug and the mounting are movable or displaceable relative to each other in the direction of longitudinal extension of the aluminum cable or of the connection piece aligned with it at least upon mutual contact. Here it is especially beneficial if the rotating mounting is displaceable. This displaceability then includes the necessary compressive force on the connection point, which is exerted during welding. Moreover, the openable jig for the end of the aluminum cable can at the same time be relied on for crimping the support sleeve provided there.

Chiefly in the combination of single or several of the above-described features and measures, there results a connection of an aluminum cable serving for electrical transmission, in which it is not possible or necessary to weld directly on the individual wires or flexible leads, but instead a support sleeve is provided made expediently of aluminum, thus the same material, whereby the wires and flexible leads can be pre-sealed. Consequently, a type of solid cylinder is formed, which simultaneously also serves as a seal over the insulation, because it can extend up to over this insulation. This seal has passed a water tightness test with a meter water column. The connection point itself has a high electrical conductivity, because an oxide layer possibly previously present on the aluminum side, and under certain circumstances even present on the copper side, can be eliminated with a relative reciprocal rotation, so that the two different metals reach an intermetallic phase and are fused and welded to each other.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings depicted in partially schematic representation.

DETAILED DESCRIPTION OF THE INVENTION

In the following described embodiments of connections of an electrical aluminum cable 1, which consists of individual aluminum wires 2 and an insulation 3, to a connection piece 4, corresponding parts receive the same reference numbers in each case.

Figure 2:
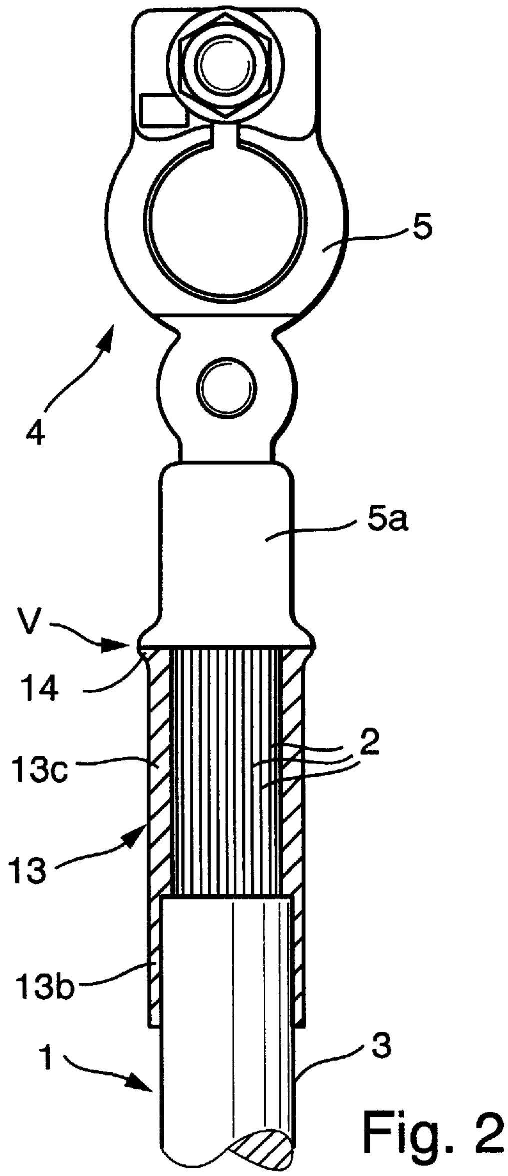
FIG. 2 is a longitudinal view of the electrical connection of the aluminum cable, the support sleeve and the battery clamp in accordance with FIG. 1, with a friction welding seam at the connection point.
Figure 4:
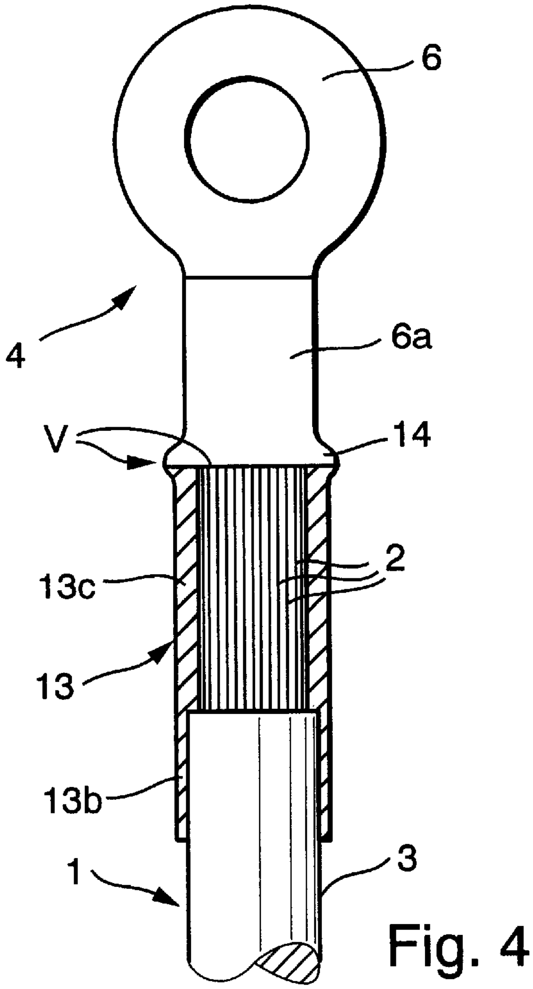
FIG. 4 is a representation corresponding to FIG. 2 of the connection of the cable shoe with the aluminum cable provided with a support sleeve.
Figure 5:
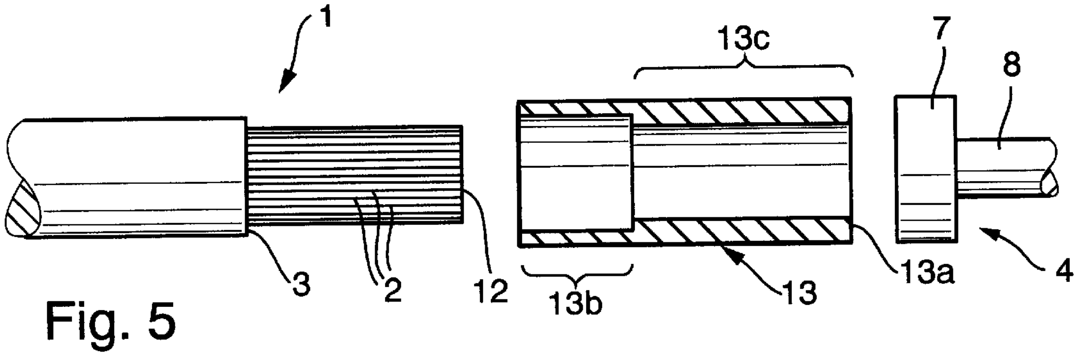
FIG. 5 is a longitudinal view of an aluminum cable, a support sleeve and a connection adapter or connector pin of nonferrous metal before their mutual connection.
Figure 8:
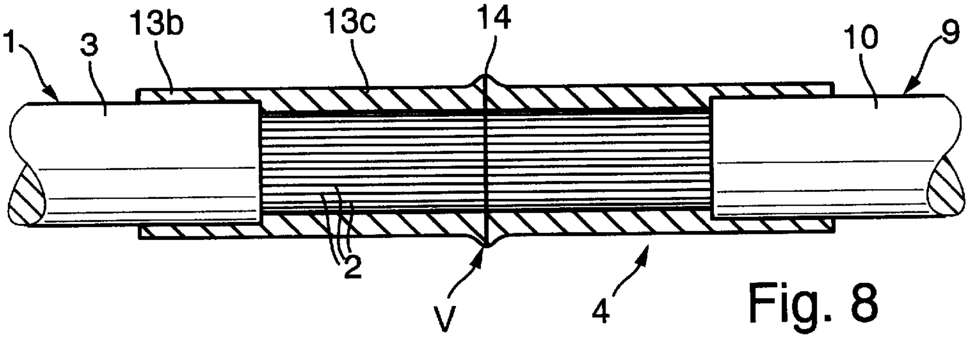
FIG. 8 is a longitudinal view of the connection of the aluminum cable provided with the support sleeve to the copper cable piece provided with the support sleeve by but or friction welding.

In FIGS. 2, 4, 6 and 8, a connection is provided of the electrical aluminum cable 1, in each case designated as a whole with V, which is made of individual aluminum wires 2 or optionally of flexible leads, and which is provided with insulation 3, to a connection piece 4 made of copper, a copper alloy and/or brass or similar metal. Moreover, FIG. 2 shows a connection V of the aluminum cable 1 with a battery clamp 5; FIG. 4 shows a this type of connection with a cable shoe 6; FIG. 5 shows a connection with a connection adapter 7, which can also be a plug part with connector pins 8; and FIG. 8 shows the connection V of an electrical cable 1 with a cable piece 9 made of copper, a copper alloy or similar metal, wherein individual wires 10 and an insulation 11 are likewise provided.

Above all, one moreover clearly recognizes in FIGS. 1, 3, 5 and 7 that the insulation 3 of the aluminum cable 1 ends before the eventual contact points (in these figures, not yet acted upon), thus ends or is spaced from the end face 12. The aluminum cable 1 is thus stripped on the end to be connected, and a support sleeve 13 is provided, which in accordance with the already mentioned FIGS. 2, 4, 6 and 8 externally surrounds the area adjacent the end face 12 of the stripped part of the aluminum cable 1 in the operating position.

The support sleeve 13 can thus first be applied and crimped or shrunk on externally in the longitudinal extension direction to the end of the stripped aluminum cable to be connected, so that the wires 2 of the aluminum cable 1 are crimped together at least in the region of the end face 12, so that in practice a solid cylinder arises. With the finished connection V, the connection piece 4, which in accordance with the individual embodiments can be configured in different manners, is welded to the end face 12 and also to the support sleeve 13. One recognizes in FIGS. 2, 4, 6 and 8, in schematic representation, a bulge-shaped annular welding seam 14. Moreover, in these figures the contact point V is further marked by a cross stroke indicating the diameter plane of connection V, although with the weld, no separation point or seam remains, but instead the two metals of the parts joined on the basis of a fusing taking place through welding heat are connected seamlessly.

One recognizes in all embodiments that, after finishing the connection V, the support sleeve 13 reaches beyond the transition between the stripped area of the aluminum cable 1 and the insulation 3, enclosing a part of the insulation 3. The support sleeve thus serves not only to press the wires 2 together and to form the solid cylinder already mentioned (which favors welding on the end face 12 and thereby thus welds together the individual wires 10 or flexible leads of the aluminum cable 1 with the connection piece made of copper or a copper alloy or brass), but at the same serves as a seal over the insulation 3. Since the support sleeve 13 is crimped or shrunk on the aluminum cable, and thereby also on the end of its insulation, the end of the insulation 3 is also connected correspondingly firmly with the wires 3 of the aluminum cable 1, so that a high degree of water tightness is attained.

Here, one clearly recognizes in all embodiments that the one end 13*a* of the support sleeve 13 is flush with the end face 12 of the stripped area of the aluminum cable 1 and with the wires, so that thus the already mentioned solid cylinder on the end face 12 of the aluminum cable 1 is practically enlarged by the thickness of the support sleeve 13 present there, and represents a correspondingly enlarged surface for connection with the connection piece 4.

At the same time, the aluminum cable 1 and the shrunken on or crimped on support sleeve 13 on the one hand, and the connection piece 4 on the other hand, have an essentially circular cross section of identical size in the respective embodiment, as one recognizes in the initial position of the parts before their mutual connection, as well as after finishing the respective connection V.

Since the support sleeve 13 crimping the end of the aluminum cable 1 together is a metal sleeve and particularly an aluminum sleeve, optionally instead a copper or brass sleeve, it participates in the welding process and in the formation of the welding seam 14, and thereby improves at the same time the mutual connection of the parts, because consequently not only the level, flat end face 12 is joined with the connection piece 4, but also the end 13*a* of the support sleeve 13, which on the other hand reaches up over the insulation 3 and distributes any possibly occurring dynamic traction or shearing forces.

The support sleeve 13 has in its interior two segments of different internal cross section or internal diameter. Segment 13*b* with the larger internal diameter here grips around the end of the insulation 3 of the aluminum cable 1, and segment 13*c* of smaller internal diameter grips around the stripped region of the aluminum cable 1. The difference between the internal diameters of these two segments 13*b* and 13*c* of support sleeve 13 here corresponds to double the thickness of the insulation 3 of the aluminum cable 1. That is, the difference between the internal radii of the two segments 13*b* and 13*c* of support sleeve 13 corresponds approximately to the thickness of the insulation 3, so that despite the stepping between the insulated and the stripped region of the aluminum cable 1, the exterior of the support sleeve 13 can run substantially smoothly and without interruption or change in diameter.

In order to produce the connection V, the aluminum cable 1 is first stripped on the connection end, wherein either the insulation 3 is removed for a specified length or is omitted from the outset. The support sleeve 13 is installed on the stripped spot. Thereafter, the support sleeve 13 is crimped or shrunk, whereby the wires 2 or flexible leads of the aluminum cable 1 are pressed together, so that on the end face 12, despite the formation of these individual wires 2, practically a solid cross section results, which is available for welding with the connection piece 4. After this, the aluminum cable 1 is butt welded together with the support sleeve 13 to the connection piece 4, which in accordance with the individual embodiments can be configured in different ways. Due to the welding heat and a mutual compressive force in the longitudinal direction of the parts to be joined, a bulge-like welding seam 14 arises here.

Moreover, in the initial position and even after production of the connection V, the support sleeve 13 with one end 13*a* is flush with the end face of the aluminum cable 1. This permits the aluminum cable 1 provided with the support sleeve 13 to be joined with the connection piece 4 by friction welding.

The connection piece 4 to be connected and butt welded with the aluminum cable 1 is here set in rotation in a manner not represented here in greater detail, and rotating with a high number of rotations, for example 1500 rpm, is pushed against the end face 12 of the aluminum cable 1 and the end 13*a* of the just previously crimped on support sleeve 13, and fused and welded by the frictional heat arising thereby after braking and stopping the rotation. In the area of the connection V the metals of the joined parts are also thereby alloyed with one another. The wires 2 or flexible leads of the aluminum cable 1 are thus pressed together before and during the welding operation, at least in the area of the end face connection point V, in order to form the above-mentioned solid cross section with a level, flat end face 12.

The support sleeve 13 is crimped flat on the exterior, in particular into a polyhedron, for example a hexagon, so that a largely uniform pressing together of the wires 2 takes place in the region of the connection V, and the support sleeve 13 can later be easily engaged from the outside with tools during assembly.

Figure 1:
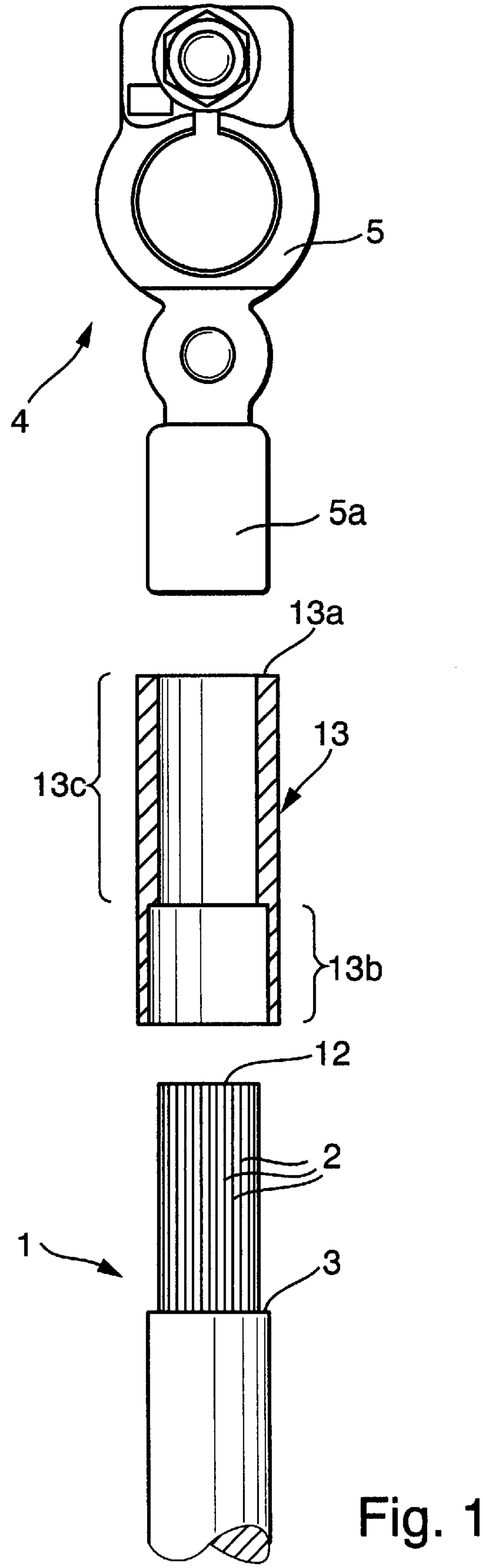
FIG. 1 is a longitudinal top view of the end of a stripped aluminum cable, a support sleeve mountable and crimpable over it, and a battery clamp made of another metal, which are to be connected electrically conducting with one another.
Figure 3:
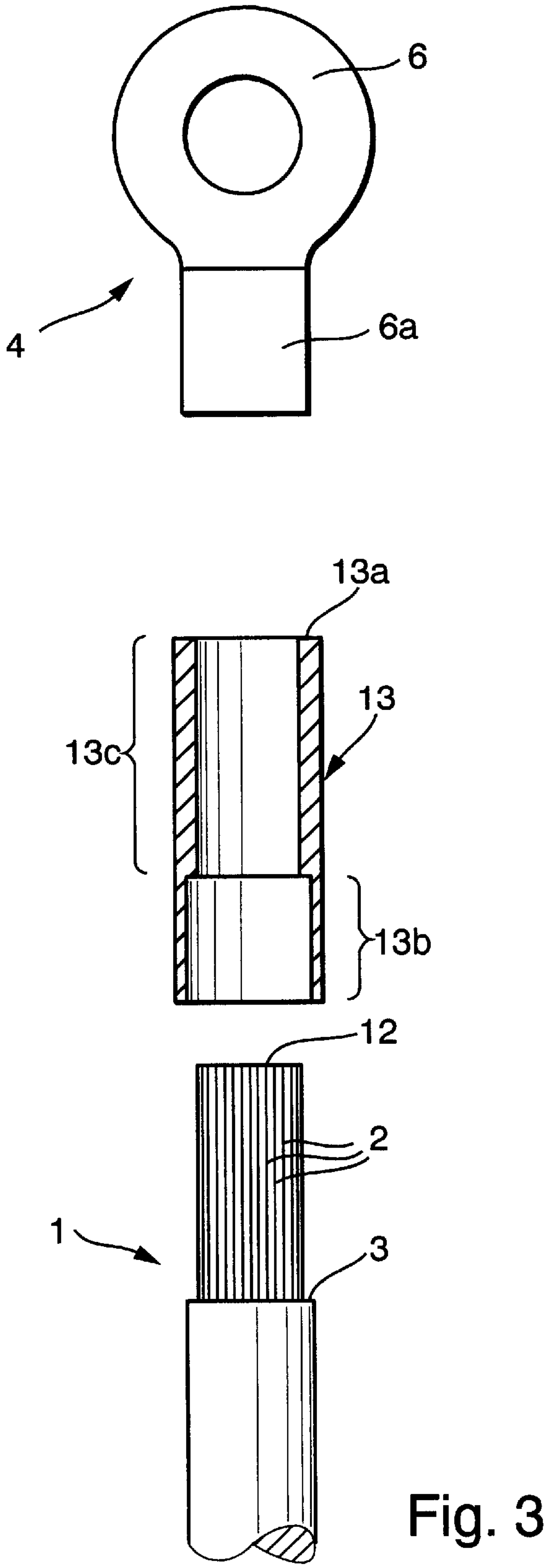
FIG. 3 is a representation corresponding to FIG. 1, in which a cable shoe is provided for electrically conducting connection and welding with an aluminum cable.
Figure 6:
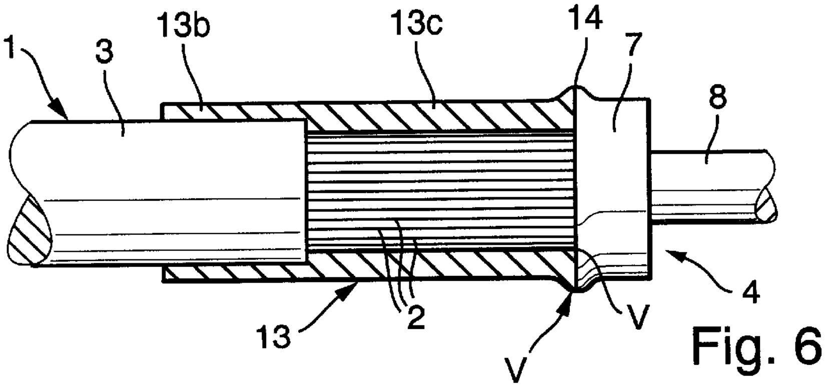
FIG. 6 is assembled view of the elements of FIG. 5 with a connection of the connection adapter to the aluminum cable by friction welding.

In accordance with FIGS. 1 and 2, a battery clamp 5 with terminal studs 5*a* can be connected with the aluminum cable 1 as a connection piece 4. FIGS. 3 and 4 show the connection of an aluminum cable 2 with a connection piece 4, which is constructed as a cable shoe 6 with a bolt-like connection piece 6*a*. In FIGS. 5 and 6 the connection of the aluminum cable 1 with a connection adapter 7 for material locking electrical connections, for example by contact pins 8, is represented, whereby the connection adapter 7 itself has the corresponding cross-sectional shape and surface for butt welding with the aluminum cable 1.

Figure 7:
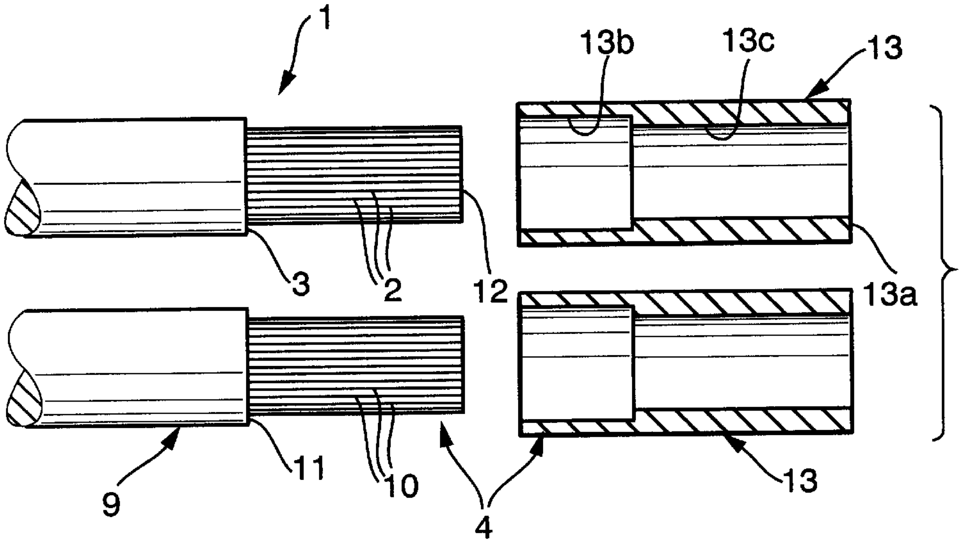
FIG. 7 is a longitudinal view of the stripped end of an aluminum cable with an associated support sleeve, and the stripped end of a copper cable with the support sleeve associated with and adapted.

Finally, FIGS. 7 and 8 show the possibility of joining an aluminum cable 1 with a cable piece 9, especially of copper or a copper alloy, as a connection piece 4. This cable piece 9, serving as a connection piece 4 made of wires of copper or a copper alloy, is crimped on its exterior likewise with a support sleeve 13, especially made of copper, a copper alloy or brass, or even aluminum, in any case of metal, and butt welded with the end face 12 of the aluminum cable 1. Here, this support sleeve 13 of copper or the like is also arranged flush at the end with the cable piece 9, so that the connection V takes place on the respective wires 2 and 10 as well as on the support sleeve 13, thus over a correspondingly enlarged cross section with corresponding stability.

A device for implementing a process of this type is not represented in greater detail and expediently includes an openable jig for the aluminum cable 1 provided with the support sleeve 13 and a separable and rotation-drivable mounting arranged in alignment therewith for the connection piece 4. The jig and the mounting are then movable or displaceable relative to each other in the longitudinal direction of the aluminum cable 1 and of the connection piece aligned with it at least by mutual contact, so that the rotating part is pressed against the part standing still. In this way, the frictional heat necessary for the friction welding operation can be generated. Moreover, the rotating mounting is expediently displaceable, since it accommodates the overall shorter or smaller connection piece 4. After braking the rotation drive, the mutual melting and welding takes place under the frictional heat arising practically over the entire cross section, which thus not only yields a firm but also a sealed connection V.

By crimping with the support sleeve 13, which also reaches over the insulation 3 of the aluminum cable 1, the aluminum wires 2 are protected and spared, and in spite of this crimping are not so strongly deformed that they can no longer withstand the later dynamic stresses. By welding—even of the individual wires 10 or flexible leads of the aluminum cable 1 with one another and with the connection piece—the different metals are alloyed with one another in the area of the connection V, i.e., in the contact area. This yields a high resistance to breakage and wear with a very good electrically conducting connection at the same time. Even high dynamic stresses can be accommodated, so that this connection is especially well suited for battery leads in motor vehicles, so that in the area of the battery, where acid vapors can arise, copper or brass, which are capable of resisting such vapors, can be used, while the further current-conducting lead can be made of the lighter aluminum.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A connection (V) of an electrical insulated aluminum cable (1) to a connection piece (4), comprising the connection piece (4) being made of a metal selected from the group consisting of copper, a copper alloy, brass, and similar metals, the aluminum cable (1) being made of a plurality of individual aluminum wires (2) or flexible leads having a bare region adjacent to one end face (12) of the cable (1) and having insulation (3) which terminates at a distance from a contact point of the cable with the connection piece (4), and a metal support sleeve (13) comprising aluminum which embraces at least the bare region of the aluminum cable (1) and reaches beyond a transition between the base region of the aluminum cable (1) and the insulation (3) so as to surround a part of the insulation (3), the support sleeve (13) being crimped and/or shrunk on the one end of the aluminum cable (1) so that the wires (2) or flexible leads of the aluminum cable (1) are crimped together at least adjacent to the one end face (12), wherein the connection piece (4) is connected by a direct intermetallic weld with the end face (12) formed by the individual wires (2) or flexible leads of the aluminum cable (1).

2. The connection according to claim 1, wherein an end (13*a*) of the support sleeve (13) is flush with the end face (12) of the bare region of the aluminum cable.

3. The connection according to claim 1, wherein the aluminum cable (1) with the shrunk on or crimped on support sleeve (13) and the connection piece (4) have substantially circular cross sections with substantially the same size.

4. The connection according to claim 1, wherein the support sleeve (13) has in its interior at least two segments of different internal cross section or internal diameter, a first segment (13*b*) having a larger internal diameter gripping around an end of the insulation (3) and a second segment (13*c*) having a smaller internal diameter gripping around the bare region of the aluminum cable (1).

5. The connection according to claim 4, wherein the difference between the internal diameters of the segments (13*b*, 13*c*) of the support sleeve (13) correspond approximately to double a thickness of the insulation (3).

6. The connection according to claim 1, wherein the end of the aluminum cable (1) provided with the support sleeve (13) is friction joined with the connection piece (4) by friction welding.

7. The connection according to claim 1, wherein the connection piece is selected from the group consisting of a battery clamp (5), a cable shoe (6), a connection adapter (7), a plug element (8), a cable (9) and similar connections for an electrical system of a motor vehicle.

8. A process for connecting an electrical aluminum cable (1) with a connection piece (4) made of a metal selected from the group consisting of copper, a copper alloy, brass, and similar metals, wherein an end face (12) of the aluminum cable (1) is brought into connection and electrical contact (V) with a face of the connection piece (4), comprising stripping the aluminum cable (1) of insulation on a connection end, applying an aluminum supporting sleeve (13) by crimping or shrinking onto the stripped connection end, such that individual wires (2) or flexible leads of the aluminum cable (1) are pressed together, and butt welding the individual wires (2) or flexible leads of the aluminum cable (1) together with the support sleeve (13) to connection piece (4), wherein the individual wires (2) or flexible leads of the aluminum cable (1) are crimped together before or during the welding at least in an area of the end face contact (V), wherein the aluminum support sleeve reaches beyond a transition between the base region of the aluminum cable (1) and the insulation (3) so as to surround a part of the insulation (3).

9. The process according to claim 8, wherein the support sleeve (13) is arranged with one end (13*a*) flush on the end face (12) of the aluminum cable (1).

10. The process according to claim 9, wherein the connection piece (4) is rotated and while rotating is pressed against the end face (12) of the aluminum cable (1) and fused or welded by the heat arising thereby after braking the rotation.

11. The process according to claim 8, wherein the aluminum cable (1) provided with the support sleeve (13) is connected with the connection piece (4) by friction welding.

12. The process according to claim 8, wherein the support sleeve (13) is crimped flat on the exterior into a polyhedral shape.

13. The process according to claim 8, wherein the connection piece comprises a cable piece (9) made of wires selected from the group consisting of copper, copper alloy and/or brass, and wherein the connection piece is crimped on its exterior with a support sleeve (13) and butt welded with the end face (12) of the aluminum cable.

* * * * *